US011750275B2

(12) United States Patent
Sedwick et al.

(10) Patent No.: US 11,750,275 B2
(45) Date of Patent: *Sep. 5, 2023

(54) GEOLOCATION OF RADIO FREQUENCY DEVICES USING SPACEBORNE PHASED ARRAYS

(71) Applicant: AST & Science, LLC, Miami, FL (US)

(72) Inventors: Raymond J. Sedwick, University Park, MD (US); Abel Avellan, Coral Gables, FL (US)

(73) Assignee: AST & Science, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,087

(22) Filed: Jan. 13, 2022

(65) Prior Publication Data

US 2022/0140890 A1 May 5, 2022

Related U.S. Application Data

(63) Continuation of application No. 17/171,759, filed on Feb. 9, 2021, now Pat. No. 11,239,904.
(Continued)

(51) Int. Cl.
*H04B 7/185* (2006.01)
*H04B 7/024* (2017.01)
*H04W 84/06* (2009.01)

(52) U.S. Cl.
CPC ......... *H04B 7/18513* (2013.01); *H04B 7/024* (2013.01); *H04B 7/1855* (2013.01); *H04W 84/06* (2013.01)

(58) Field of Classification Search
CPC ............... H04B 7/18513; H04B 7/024; H04B 7/18558; H04B 7/1855; H04W 84/06
See application file for complete search history.

(56) References Cited

U.S. PATENT DOCUMENTS 5,777,580 A 7/1998 Janky
6,243,648 B1 6/2001 Kilfeather
(Continued)

FOREIGN PATENT DOCUMENTS

EP 0611500 A1 8/1994
WO WO-98/02762 A2 1/1998

OTHER PUBLICATIONS

International Search Report and Written Opinion for PCT/US2021/017223, dated May 7, 2021.

*Primary Examiner* — Keith Ferguson
(74) *Attorney, Agent, or Firm* — Botos Churchill IP Law LLP

(57) ABSTRACT

A communication system has a phased antenna array configured to communicate via a plurality of beams with a wireless device, such as user equipment (e.g., a smart phone). The plurality of beams define a field of view of the phased antenna array, the field of view having a plurality of cells and each of the plurality of beams is associated with one of the plurality of cells within the field of view. A processing device detects the wireless device within the field of view and determines a coarse geographic location of the wireless device within the field of view of the wireless device when the wireless device is within the field of view, or within a cell. The system further determines a fine geographic location for the wireless device based on frequency offset (due to Doppler) and signal flight time.

18 Claims, 7 Drawing Sheets

Related U.S. Application Data

(60) Provisional application No. 62/975,027, filed on Feb. 11, 2020.

(56) References Cited

U.S. PATENT DOCUMENTS

| | | | |
|---|---|---|---|
| 6,356,740 B1* | 3/2002 | Malcolm | H03J 7/02 |
| | | | 455/12.1 |
| 6,556,809 B1 | 4/2003 | Gross | |
| 8,787,903 B2* | 7/2014 | Boustie | H04W 72/0446 |
| | | | 455/430 |
| 9,973,266 B1 | 5/2018 | Avellan et al. | |
| 2007/0184849 A1 | 8/2007 | Zheng | |
| 2013/0058271 A1 | 3/2013 | De Latour | |
| 2013/0195216 A1* | 8/2013 | Nakasha | H04B 1/7172 |
| | | | 375/295 |
| 2016/0119931 A1* | 4/2016 | Soriaga | H04W 72/1263 |
| | | | 370/329 |
| 2016/0356650 A1* | 12/2016 | Zhang | G01J 3/28 |
| 2017/0289822 A1 | 10/2017 | Hreha | |
| 2019/0199431 A1 | 6/2019 | Speidel et al. | |
| 2019/0238216 A1 | 8/2019 | Avellan et al. | |

\* cited by examiner

US 11,750,275 B2

GEOLOCATION OF RADIO FREQUENCY DEVICES USING SPACEBORNE PHASED ARRAYS

RELATED APPLICATION

This application is a continuation application of U.S. patent application Ser. No. 17/171,759, filed on Feb. 9, 2021, now U.S. Pat. Ser. No. 11/239,904, which claims the benefit of priority of U.S. Provisional Application No. 62/975,027, filed on Feb. 11, 2020. The contents of which are incorporated herein by reference in their entirety.

BACKGROUND

U.S. Pat. No. 9,973,266 shows a system for assembling a large number of small satellite antenna assemblies in space to form a large array. The entire content of the '266 patent is incorporated herein by reference. As disclosed in the '266 patent, FIGS. 1(a), 1(b) show a satellite communication system 100 having an array 300 of small satellites 302 and a central or control satellite 200. The small satellites 302 communicate with end users 500 within a footprint 400 on Earth, and also communicate with the control satellite 200, which in turn communicates with a gateway 600 at a base station. The small satellites 302 can each include, for example, a processing device (e.g., a processor or controller) and one or more antenna elements. And the control satellite 200 can include a processing device and one or more antenna or antenna elements. Thus, the '266 patent localizes radio frequency (RF) devices on the Earth using an orbiting constellation of phased arrays 300 that can communicate with these devices.

SUMMARY

The system provides phased arrays that create cells on the surface of the Earth. An RF device that is detected by the system is known to be within one of these cells, localizing it at least to within the physical extent of the cell. Additional knowledge of round-trip signal time, signal strength, and signal frequency shift between the phased array and the RF device may then provide better geolocation accuracy. Localization generally refers to identifying the position of an object on the Earth's surface to within a reduced uncertainty.

DETAILED DESCRIPTION

Figure 1A:
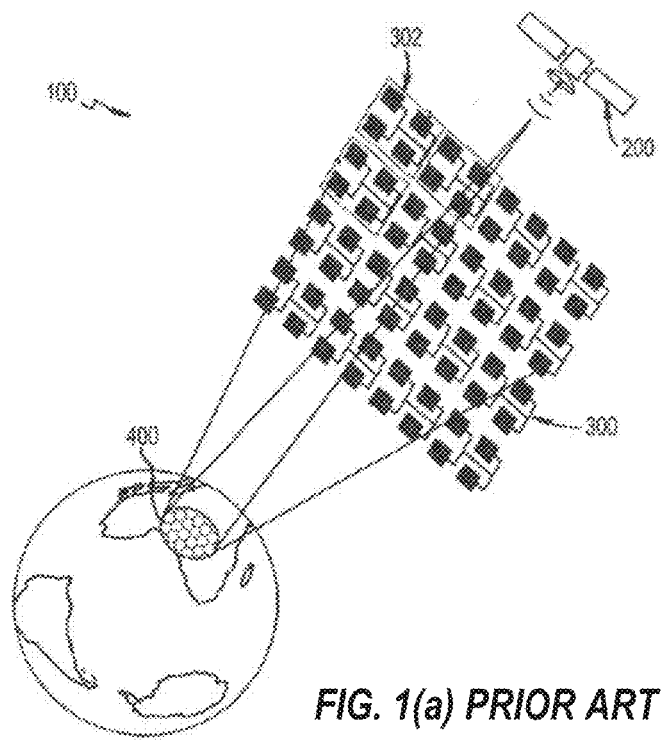
FIGS. 1(a), 1(b) show a known phase array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Figure 1B:
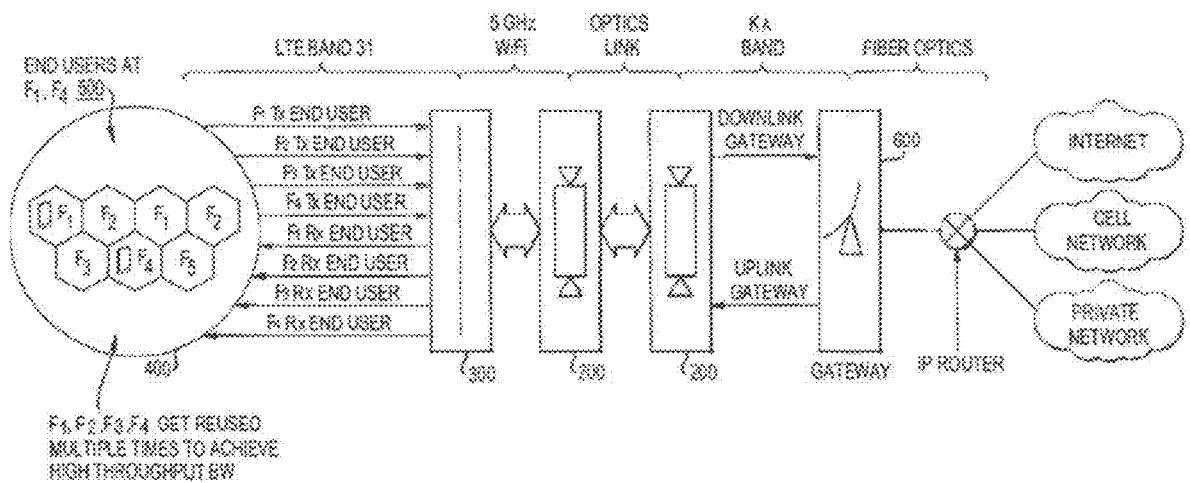

The system and method of the present disclosure is especially useful with a spaceborne constellation of satellites equipped with phased arrays that communicate with RF devices on the ground, such as shown in the '266 patent, which are reproduced here as FIGS. 1(a), 1(b). However, the system and method can be utilized with any suitable satellite communication system. Each phased array in orbit can simultaneously generate some number (Nb) of individual beams within the ground field of view (FOV) of the array, as shown in FIG. 1(a). The intersection of each of these beams with the ground then constitutes a ground cell. A single satellite can geolocate an RF device whenever it is within its FOV. A FOV can include one or more ground cells, and typically includes a plurality of ground cells.

To be able to provide localization anywhere on the surface of the Earth at any given instant, a sufficient number of satellites must be distributed in Earth orbit to place a full mosaic of cells over the entire Earth's surface at all times. However, even a single satellite at a high enough orbital inclination will provide localization twice daily anywhere on the Earth's surface.

A User Equipment (UE) (e.g., an RF device such as an end user device such as a mobile phone) that is detectable by the satellite through a particular beam is identifiable after signal processing as being connected through that specific beam. The satellite knows the direction of each of the beams and can therefore determine the ground cell in which the RF signal has originated. If the RF device is designed to communicate with the phased array, the array can provide the position information to the RF device through the connection. For example, that position information can be within a particular cell (if detected within a particular cell of the FOV).

Accordingly, any object that is emitting RF within the frequency band that we can detect, at a signal strength that we can detect, can be detected and potentially isolated down the finest level. So, a cell phone that is emitting RF but has not necessarily established a communications link with the system can still be detected. Thus, without any special processing the system knows which cell on the Earth the signal originates from, which is better than just knowing that it is "somewhere" and that it is within the FOV of a particular satellite.

This provides a coarse level of localization (i.e. coarse geographic location) to a particular cell. The angular size of the beam depends on the size of the array and the operational frequency used for the detection. The distance between the satellite and the ground and the geometry of the beam intersection with the ground then determines the size and shape of the cell. The ground-projected width of the cell (orthogonal to the range direction) is given by:

$$w_{cell} = 1.22 \frac{\lambda R}{D}$$

where λ, R and D are the wavelength of the signal, the range to the center of the cell and the array diameter, respectively.

Increasing the operating frequency, increasing the array size, or decreasing the altitude will each independently reduce the cell size. Conversely, doing the opposite will increase the cell size. As an example, at a wavelength of 30 cm, a range of 700 km, and an array diameter of 20 m, the cell width will be just under 13 km. This would correspond to the width of the cell at nadir, assuming an altitude of 700 km. At nadir, the cell shape would be circular, so that the length of the cell would also be just under 13 km. At the edge of the FOV, the range to the target at this altitude is roughly twice the distance to nadir (~1400 km), and due to elongation of the cell near the horizon, the length of the cell is approximately three times the width. So, the cell size near the edge of the FOV would be elliptical, with a width of 26 km and a length of 78 km. An RF signal detected through such a beam would be localizable to this accuracy. Of course, any suitable sizes and shape can be provided within the scope of this disclosure.

An improvement on localization (i.e., fine geographic location) can also be achieved if the transmission frequency of the object (e.g., a UE device) is known. In this case, the observed frequency shift due to the Doppler effect can be used to localize the device to a particular iso-Doppler line within the cell. The Doppler shift can arise either due to the motion of the satellite in orbit or to the motion of the object on the ground. A stationary or slowly moving object will have an apparent frequency shift that is primarily due to the known motion of the satellite. Lines of constant Doppler shift form hyperbolic lines on the ground, with the foci of the hyperbolas lying along the satellite path projected onto the ground.

If the RF signal is cooperative with the array, such that the round-trip time of flight of the signal either to the array and back or to the object and back can be determined to sufficient precision. At a speed of $3(10^5)$ km/sec, round trip signal flight time that is known to ~1 μsec, can be used to determine the distance between the array and the object to within 150 m, with better timing knowledge leading to better distance resolution. Constant time-of-flight contours form concentric circles around the nadir point of the array, passing through each ground cell with different orientations relative to the satellite velocity vector.

Along the direction of the satellite's motion, the iso-Doppler lines and the iso-flight time contours are parallel and do not provide differentiating information. In the cross-track direction to the satellite's motion, the iso-Doppler and iso-flight time contours are orthogonal to each other and can provide unambiguous localization in two directions, localizing the signal to a better resolution than at the cell level. This is the situation when you are looking at right angles to the direction of the satellites motion. For any given pair of coordinates (Doppler shift, delay) you know where you are to whatever the grid size is. However, when looking in the direction of the satellites motion, the iso-Doppler and iso-delay lines are aligned.

Similar to systems like the Global Positioning System (GPS), geolocation requires that the location of the satellites also be known to adequate precision, since the distance to the satellite itself is the basis for determining the signal location. Ground tracking of the satellites in the constellation can be done using a variety of methods, including triangulation of transmitted signals from the satellite to multiple ground stations. The specific method or methods of localizing the satellite positions is not included as part of the system and method of the present disclosure.

In addition, time advance helps with localizing to a particular iso-delay contour, though has ambiguity along the contours. This ambiguity can be resolved with information on Doppler or possibly power level. If the Doppler, delay, and power contours are aligned (such as when the RF device is along the path of the satellite) then we can't localize very well in the cross-track direction. If either the Doppler or the power contours cross the delay contours, then there is better localization in two directions.

The theoretical performance can be determined probabilistically given the ability to resolve the Doppler shift and the power relative to the center of the beam. So, for instance, if the Doppler shift relative to the beam center is known to within X %, or if the power received relative to the center of the beam is known to Y %, then the probability distribution of the position uncertainty on the ground is Z meters.

It is noted that the localization techniques mentioned herein can be utilized together or separately, including for example known signal strength and gain, known transmission frequency, frequency offset due to Doppler, and RF signal cooperative with the array (round-trip time of the signal to the array and back or to object and back).

FIGS. 2-7 are representations of ground contours within the FOV of the satellite on the ground. For example, in FIG. 2, the satellite would at the center, but 700 km out of the page.

Beams, Iso-Doppler Contours in Satellite FOV

Figure 2:
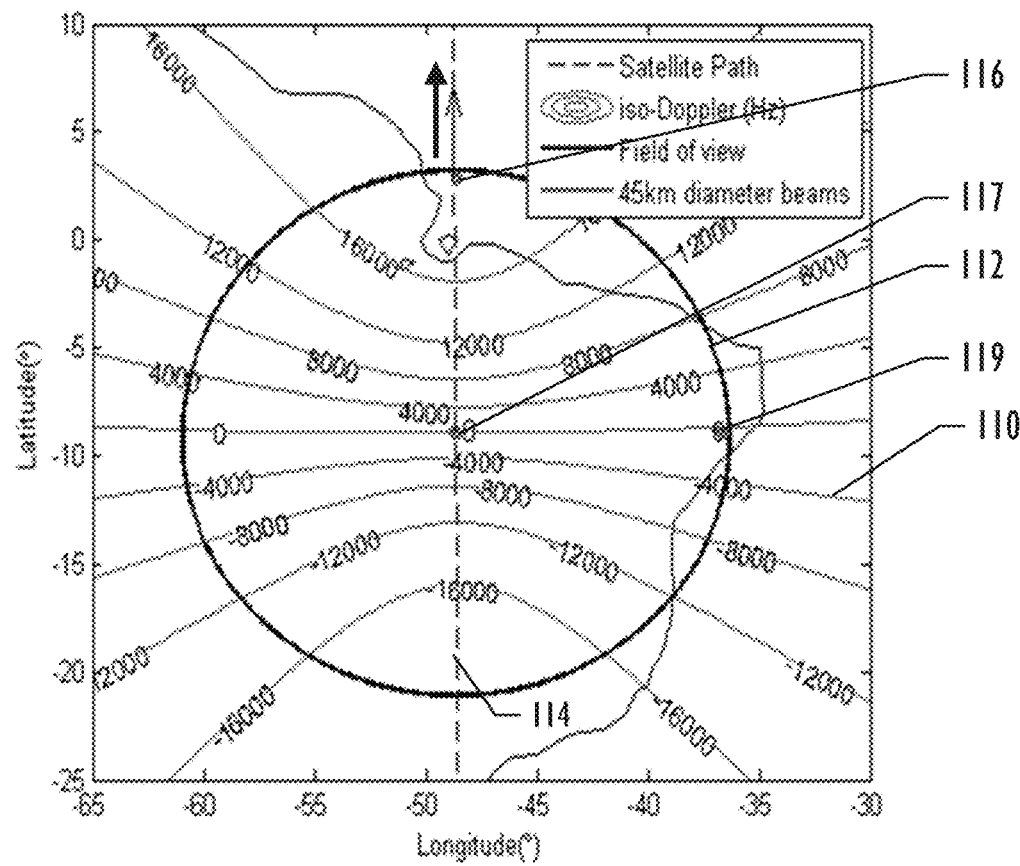
FIG. 2 is a plot of lines of constant Doppler shift relative to the nadir point.

Accordingly, Doppler shift and delay can be used for localization. But this only works if the Doppler shift of signals varies spatially across the FOV and across the cell. FIG. 2 shows that Doppler shift varies across the FOV. Specifically, it shows a plot of lines of constant Doppler shift (thin line hyperbolas) 110 relative to the spacecraft nadir point (center). The thick circular boundary is the spacecraft field of view 112 out to an arbitrarily assumed minimum elevation angle of 20 degrees at which point the field of view spans approximately 25 degrees in each direction. Spacecraft motion along an orbital path 114 in the diagram is toward the top of the figure, as indicated by the arrow. The maximum positive Doppler shift value shown is 16000 Hz toward the top of the figure and the maximum negative value shown is −16000 Hz toward the bottom of the figure. The 45 km diameter beams 116 are indicated as well.

In FIG. 2, the large circle is a FOV with about a 2700 km diameter. The three regions (cells) 116, 117, 119 are each about 45 km in diameter.

Differential Dopplers for Central-Beam in FOV

Figure 3:
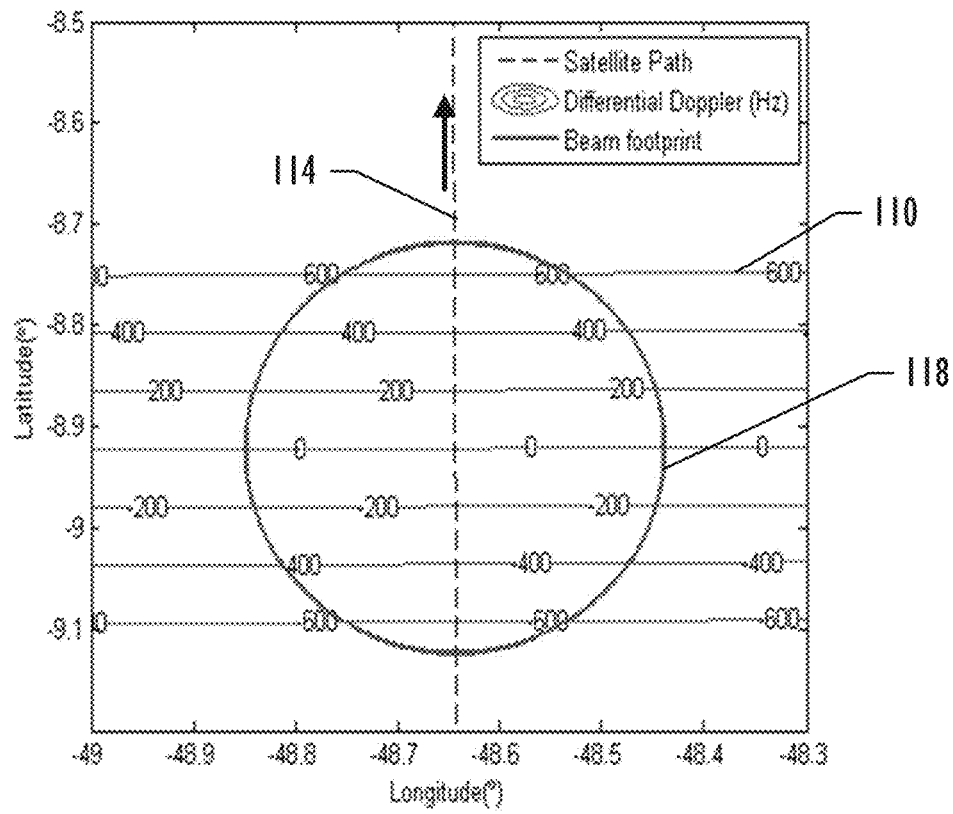
FIG. 3 is a plot of lines of constant Doppler shift relative to the center of the beam for the central beam within the field of view.

FIG. 3 is a plot of lines of constant Doppler shift (thin horizontal lines) 110 relative to the center of the beam for the central (nadir facing) beam 118 within the field of view. The thick circular boundary is the beam 118, which is seen to extend less than 0.5 degrees in each direction. Spacecraft motion 114 in the diagram is toward the top of the figure, as indicated by the arrow. The maximum positive Doppler shift value shown is 600 Hz toward the top of the figure and the maximum negative value shown is −600 Hz toward the bottom of the figure.

The large circle in FIG. 3 is a magnification of the cell 117 in the center of the FOV in FIG. 2, so again the satellite would be in the center and 700 km out of the page. The circle is about 45 km in diameter.

Differential Dopplers for Beam at Right Edge of FOV

Figure 4:
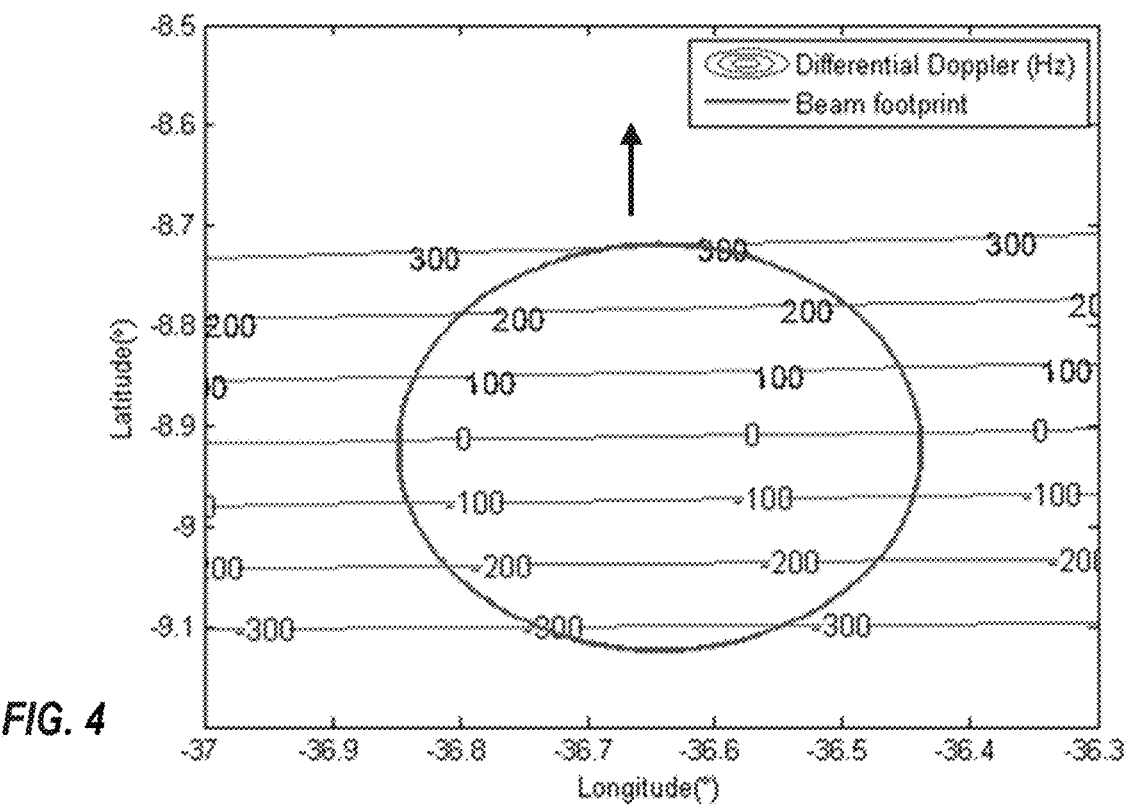
FIG. 4 is a plot of lines of constant Doppler shift (thin horizontal lines) relative to a beam center for a beam at the right edge of the field of view.

FIG. 4 is a plot of lines of constant Doppler shift (thin horizontal lines) relative to a beam center for a beam at the right edge of the field of view. The thick elliptical boundary is beam, which is seen to extend less than 0.5 degrees in each direction. Spacecraft motion in the diagram is toward the top of the figure, as shown by the arrow. The maximum positive value shown is 300 Hz toward the top of the figure and the maximum negative value shown is −300 Hz toward the bottom of the figure. The range of Doppler shift at the edge of the FOV is only about half of what it is near the center of the FOV, but the orientation to the side is similar.

The ellipse in FIG. 4 is a magnification of the cell 119 in FIG. 2, so here the satellite would be 1350 km to the left (2700/2 km) an 700 km out of the page. The ellipse is about 45 km high.

Beams, Iso-Delay Contours in Satellite FOV

Figure 5:
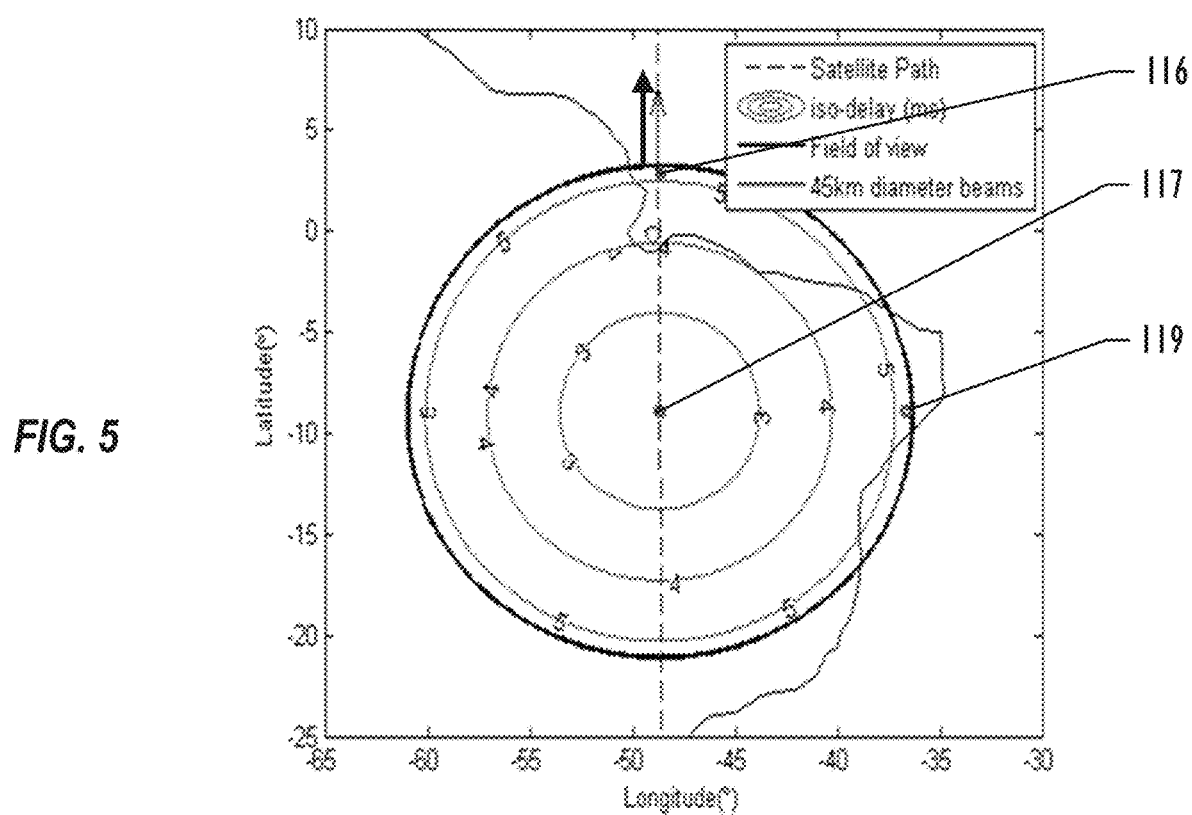
FIG. 5 is a plot of lines of constant time delay relative to the spacecraft nadir point.

FIG. 5 is a plot of lines of constant time delay (thin circular lines) relative to the spacecraft nadir point (center). The thick circular boundary is the spacecraft field of view out to an arbitrarily assumed minimum elevation angle of 20 degrees at which point the field of view spans approximately 25 degrees in each direction. Spacecraft motion in the diagram is toward the top of the figure, as shown by the arrow. The maximum delay beyond what is seen at the nadir point that is shown is 5 msec near the edge of the field of view.

FIG. 5 returns to the same FOV as FIG. 3, where the outer circle is again 2700 km across and the same cells 116, 117, 119 are shown. The satellite again is in the center and 700 km out of the page.

Thus, this figure shows how the signal delay varies across the FOV, and more importantly the iso-delay lines are not co-incident with the iso-Doppler lines, meaning that they cross each other. The crossing is important because it provides a way of identifying the location in two independent directions, for instance latitude and longitude. If the system can identify a unique iso-Doppler line for the signal and a unique iso-delay line for the signal, these only intersect in 2 places, but those two places occur in different beams within the FOV so that we will know which intersection point represents the signal's location.

Differential Delays for Central-Beam in FOV

FIG. 6 is a plot of lines of constant time delay (thin circular lines) relative to the beam center for the central (nadir facing) beam within the field of view. The dark circular boundary is the beam edge, which is seen to extend less than 0.5 degrees in each direction. Spacecraft motion in the diagram is toward the top of the figure, as shown by the arrow. The maximum labeled delay beyond what is seen at the nadir point that is shown is approximately 0.80 msec.

Figure 6A:
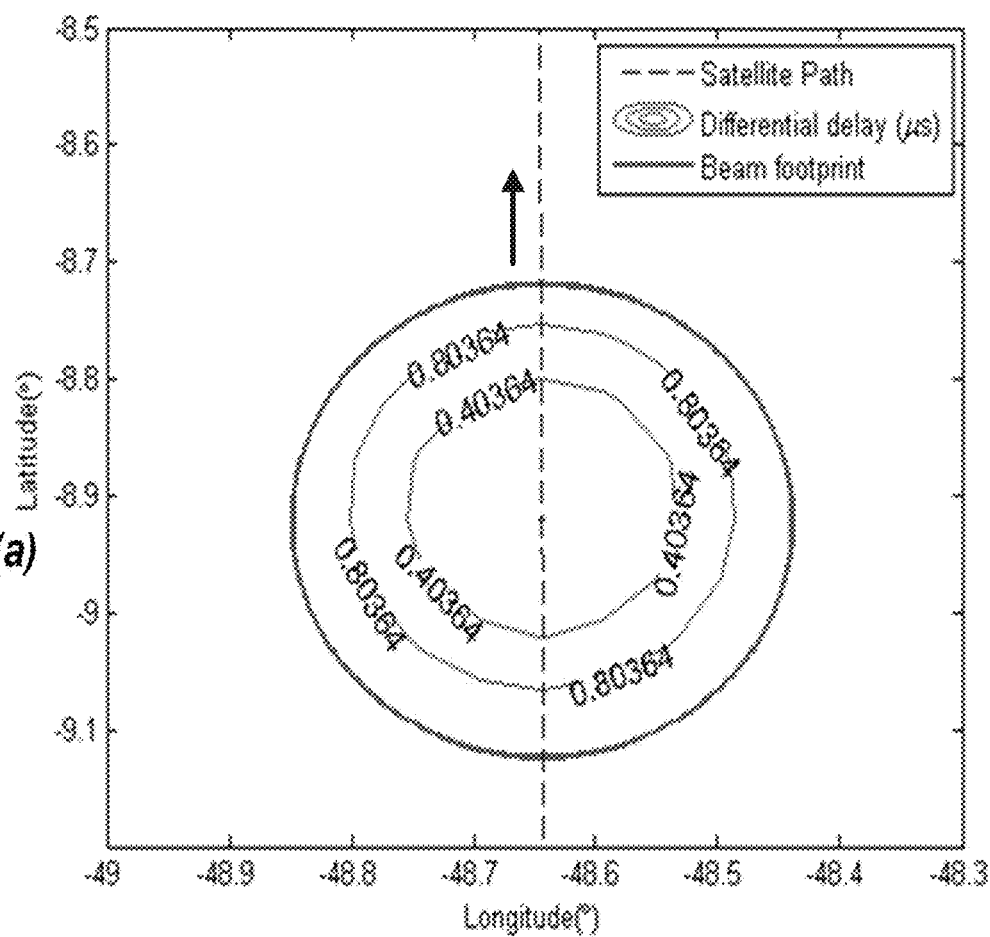
FIG. 6(a) is a plot of lines of constant time delay relative to the beam center for the central beam within the field of view.

The outer circle in FIG. 6(a) is a magnification of the cell 117 that was in the center of the FOV in FIGS. 2, 5. The satellite is again in the center and 700 km out of the page.

Differential Delays for Beam at Right Edge of FOV

Figure 7A:
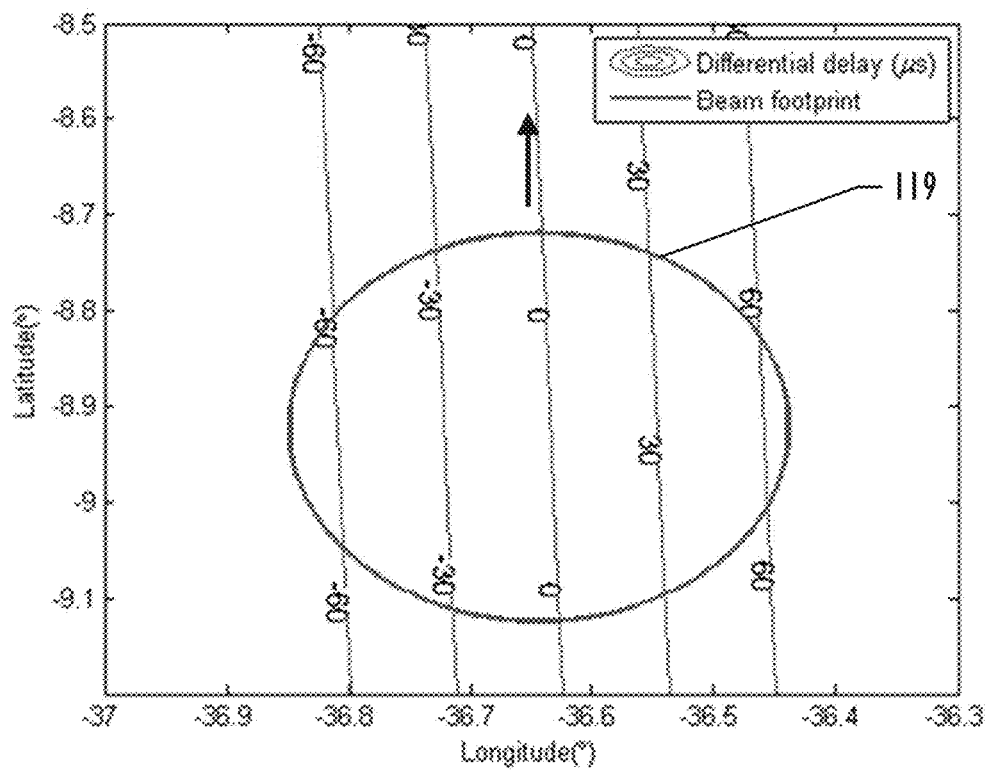
FIG. 7(a) is a plot of lines of constant time delay relative to the beam center for a beam at the right edge of the field of view.

FIG. 7(a) is a plot of lines of constant time delay (thin vertical lines) relative to the beam center for a beam at the right edge of the field of view. The thick elliptical boundary is the beam edge, which is seen to extend less than 0.5 degrees in each direction. Spacecraft motion in the diagram is toward the top of the figure, as shown by the arrow. The maximum labeled positive delay relative to the center of the beam that is shown is 60 microseconds, and the maximum labeled negative delay relative to the center of the beam that is shown is −60 microseconds. Thus, this figure shows how the delay varies across a representative cell that is at the right side of the FOV. It is different in character than the cell near the center, but there is still a variation that can be leveraged to differentiate position.

The ellipse in FIG. 7(a) is a magnification of the cell 199-119 of FIGS. 2, 5. The satellite again is 1350 km to the left and 700 km out of the page.

Figure 6B:
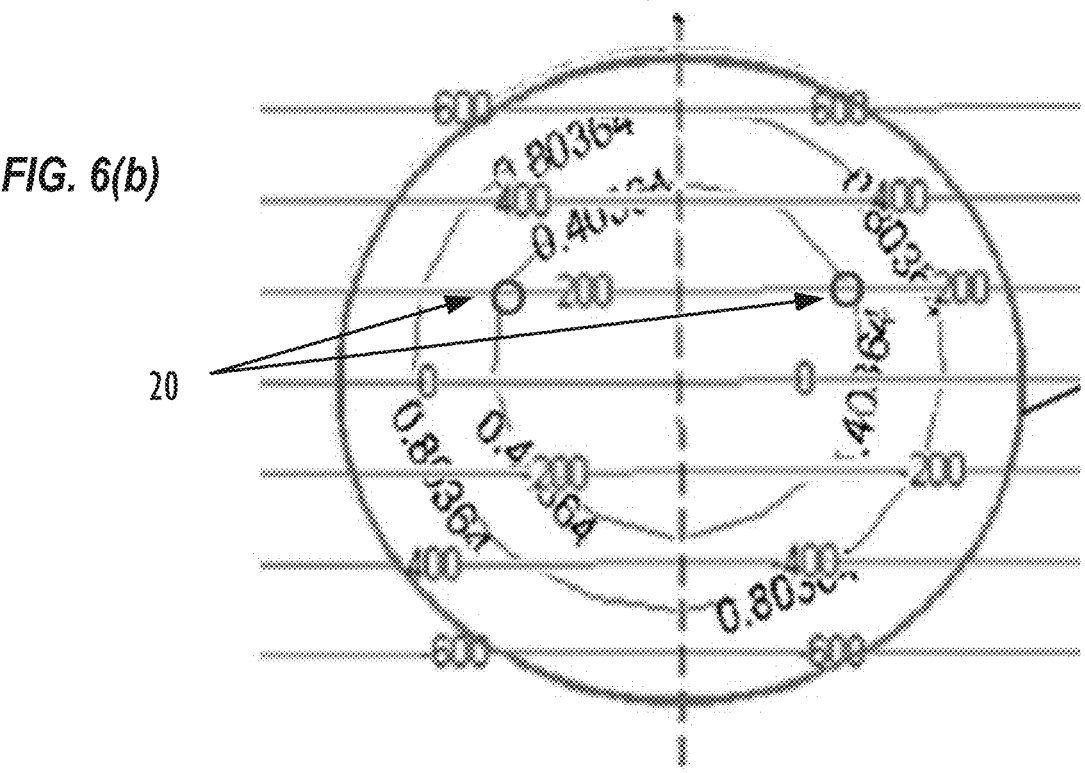
FIG. 6(b) is a plot overlaying FIG. 3 and FIG. 6(a) for central FOV cell and showing the location with 2-fold ambiguity (central cell only)
Figure 7B:
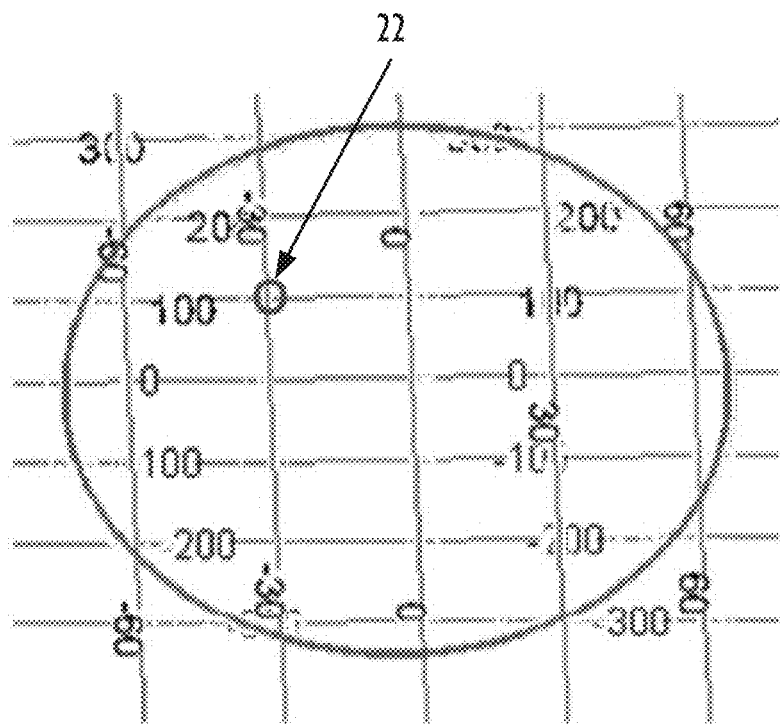
FIG. 7(b) is a plot overlaying FIG. 4 and FIG. 7(a) for right side FOV cell and showing location with no ambiguity.

FIG. 6(b) is a plot overlaying FIG. 3 and FIG. 6(a) for central FOV cell and showing the location with 2-fold ambiguity (central cell only). And FIG. 7(b) is a plot overlaying FIG. 4 and FIG. 7(a) for right side FOV cell and showing location with a single location 22, such that there is no ambiguity. In FIGS. 6(b), 7(b), the residual Doppler lines in FIGS. 3, 4, and the residual delay lines in FIGS. 6(a), 7(a) can be seen to cross each other in their respective cells. Where the lines cross then determine the origin of the signal within the cell. A unique property of the central cell (FIGS. 3, 6(a)) is that there is a 2-fold ambiguity in the solution because (for example) the 200 Hz Doppler shift line of FIG. 4 crosses the 0.40364 microsecond delay circle in FIG. 6(a) at 2 locations 20. In any other cell this is not the case. As the satellite moves, the signal moves from cell to cell within the FOV at a rate of about 1 cell every 6 seconds. So if the signal happens to be in the central (nadir) cell where the ambiguity is present, it will move out of that cell 6 seconds later.

Figure 8:
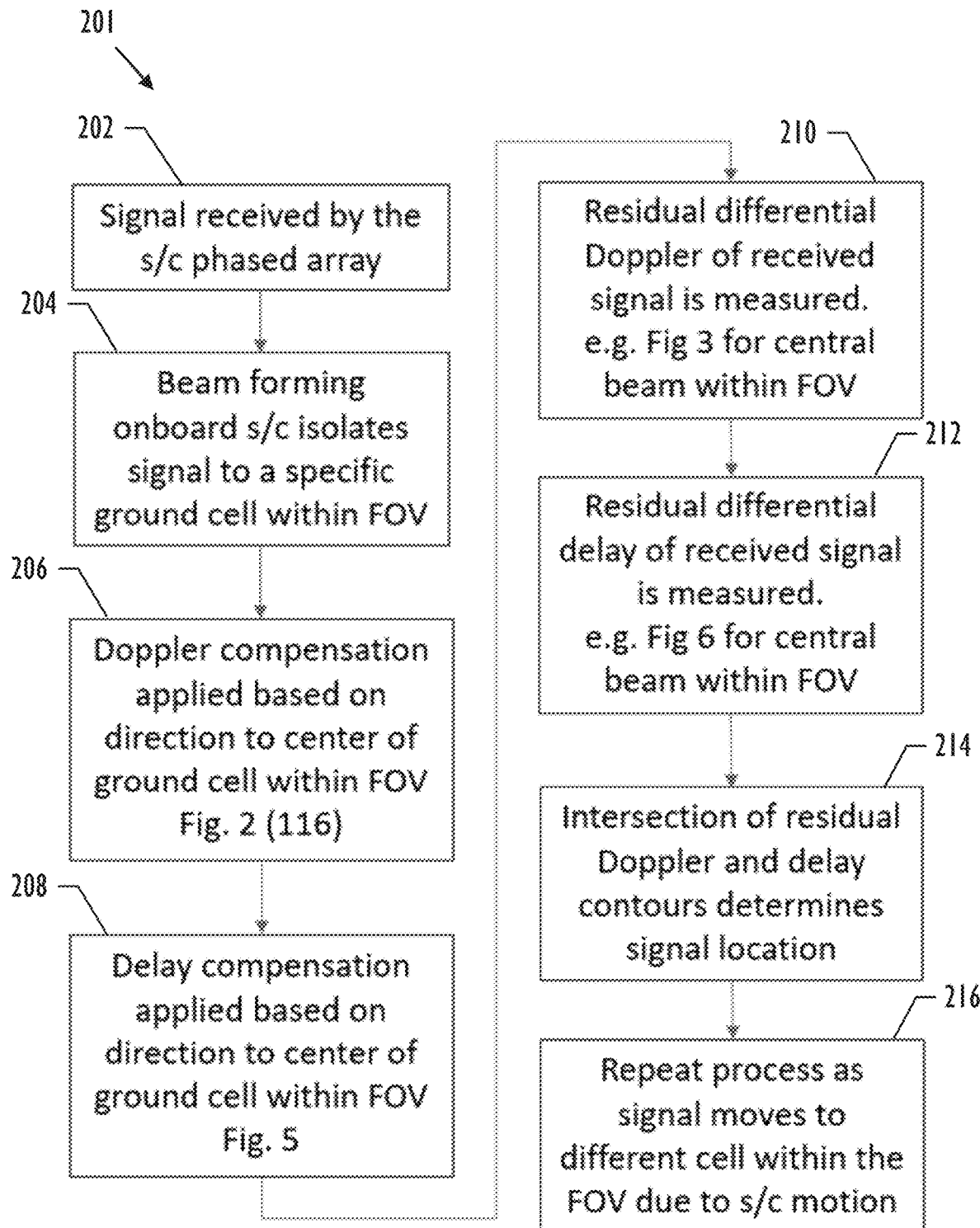
FIG. 8 is a flow diagram of geolocation.
Figure 9:
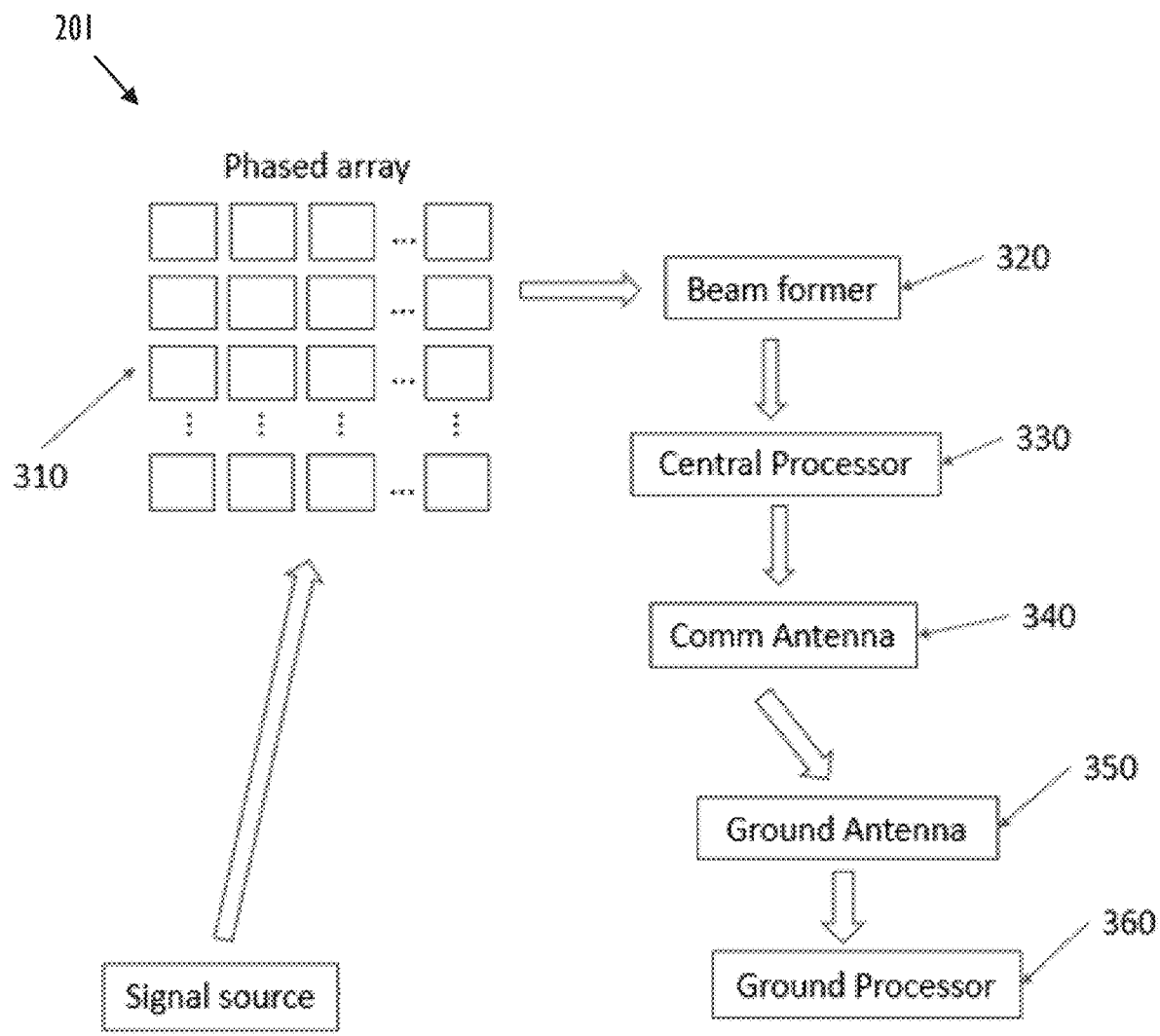
FIG. 9 is a block diagram of the system.

Turning to FIGS. 8-9, the operation 201 of the system is illustrated. The signal source transmits a signal that is received 202 by the phased array 310, whereby the processing device on each of the common satellites 302 digitizes its received signal and passes the data to the Central Processor 330 in the control satellite 200. The beamformer 320 isolates 204 the signal to a specific ground cell within the spacecraft field of view (FOV). The Central Processor 330 in the central satellite 200 (FIG. 1(a)) takes the data from all the individual beams and packages this data into a signal that is transmitted via the Comm Antenna 340 to the Ground Antenna 350. The data is then received by the Ground Processor (GP) 360, where the remainder of the processing occurs. For each ground cell within the spacecraft FOV, the GP performs Doppler compensation, whereby all signals within the cell are initially assumed to have originated at the center of the cell. The GP then performs delay compensation, whereby all signals within the cell are initially assumed to have originated at the center of the cell.

If the true signal transmission frequency is known, the GP then determines 210 the residual differential Doppler of the received signal relative to the center of the cell, isolating the signal to a narrow band around an iso-Doppler line within the cell. If the true signal frequency is not known, then a comparison is made from when the same signal was detected in a previous cell, when the residual differential Doppler of the signal would have been different. These comparisons allow for the true signal frequency to be determined. The GP 360 then determines 212 the residual differential delay of the received signal relative to the cell center, isolating the signal to a narrow band around an iso-delay line within the cell. The GP 360 then determines 214 the point of intersection of the differential Doppler and delay lines to reduce the uncertainty of the signal origin with the 45 km ground cell.

Thus, the system provides a coarse geographic location (known to within a cell) or a fine geographic location (based on iso-Doppler and iso-delay/flight time).

In the embodiments shown, the common or small satellites 302 can include a common processing device and/or the central satellite 200 can include a central processing device 330 to perform various functions and operations in accordance with the system and method of the present disclosure, such as the eNodeB 13. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the system and method of the present disclosure can be stored on or read from the storage device. The processing device can execute software that can be stored on the storage device. Unless indicated otherwise, the process is preferably implemented in automatically by the processor substantially in real time without delay.

When the system is used in an antenna assembly or a plurality of antenna assemblies connected in an antenna array, it (e.g., the antennas) communicates with wireless devices on Earth, such as for example a user device (e.g., cell phone, tablet, computer) and/or a ground station. The present disclosure also includes the method of utilizing the array to communicate with processing devices on Earth. The present disclosure also includes the method of processing devices on Earth communicating with the antenna assemblies. In addition, the antenna assembly is used in Low Earth Orbit (LEO), or in other orbits or for other applications. Still further, while the system and method of the present disclosure has been described as for an array of antenna assemblies, the system and method of the present disclosure can be utilized for other applications, such as for example data centers, reflectors, and other structures, both implemented in space or terrestrially.

In yet another embodiment of the present disclosure, data (such as position and attitude) can be transmitted from the satellites 10 and/or 200 (e.g., by the satellite processing device or central satellite processing device) to a ground station. The ground station processing device can then determine the localization. In another embodiment, the control satellite processing device or common satellite processing device can determine the localization.

It is further noted that the system of the present disclosure has been described for use with user equipment (UE), such as smart phones and the like. It will be apparent that the system can be used to transmit and/or receive with any wireless device, such as a radio frequency (RF) device or UE, and can further be used to communicate with the wireless device. For localization, however, the system need not be connected to the wireless device, i.e., the central processor 330 need not have a communicate link with or otherwise exchange data with the wireless device. Instead, the central process 330 can be disconnected from the wireless device, and need only receive signals from the wireless device.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A satellite communication system comprising:
one or more low Earth orbit (LEO) satellites comprising:
a phased antenna array configured to provide a plurality of beams and a field of view, the field of view having a plurality of cells and each of the plurality of beams is associated with one of the plurality of cells within the field of view; and
one or more delay compensators configured to perform delay compensation on signals relative to center or approximately center of each of the plurality of beams so as to obtain an approximately constant or fixed delay;
wherein each of the plurality of beams has one or more frequencies, and the phased antenna array is configured to receive a signal from a wireless device via one of the plurality of beams based on the one or more frequencies;
wherein the phased antenna array is configured to detect that the signal is within the field of view; and
wherein power of the signal is less than approximately 1 Watt and gain of the signal is less than approximately 0 dB.

2. The communication system of claim 1, further comprising one or more processing devices configured to determine a coarse geographic location of the wireless device within the field of view when the wireless device is within the field of view.

3. The communication system of claim 1, further comprising one or more doppler compensators configured to perform doppler compensation on signals relative to center or approximately center of each of the plurality of beams.

4. The communication system of claim 1, wherein processing of the detection of the signal being within the field of view is performed at one or more ground stations of the communication system.

5. The communication system of claim 1, wherein processing of the detection of the signal being within the field of view is performed at one or more satellites of the communication system.

6. The communication system of claim 1, wherein one or more of the plurality of cells has a diameter of approximately 40 to 50 km.

7. The communication system of claim 1, wherein the plurality of beams has a frequency in the range of 400 to 900 MHz.

8. The communication system of claim 1, wherein the one or more LEO satellites further include the one or more delay compensators.

9. A communication system comprising:
one or more satellites comprising:
a plurality of phased array antennas configured to provide a plurality of beams and a field of view, the field of view having a plurality of cells and each of the plurality of beams is associated with one of the plurality of cells within the field of view; and
one or more delay compensators configured to perform delay compensation on signals relative to center or approximately center of each of the plurality of beams so as to obtain an approximately constant or fixed delay;
wherein each of the plurality of beams has one or more frequencies, and the plurality of phased array antennas is configured to receive a signal from a terrestrial user device via one of the plurality of beams based on the one or more frequencies; and
wherein the plurality of phased array antennas is arranged to have a sufficient size such that the plurality of phased array antennas is configured to detect that the signal is within the field of view, the signal having less than approximately 1 Watt signal power and less than approximately 0 dB gain.

10. The communication system of claim 9, further comprising one or more processing devices configured to determine a coarse geographic location of the terrestrial user device within the field of view when the user device is within the field of view.

11. The communication system of claim 9, further comprising one or more doppler compensators configured to perform doppler compensation on signals relative to center or approximately center of each of the plurality of beams.

12. The communication system of claim 9, wherein processing of the detection of the signal being within the field of view is performed at one or more ground stations of the communication system.

13. The communication system of claim 9, wherein processing of the detection of the signal being within the field of view is performed at the one or more satellites, wherein the one or more satellites are configured to operate in low Earth orbit (LEO).

14. The communication system of claim 9, wherein one or more of the plurality of cells has a diameter of approximately 40 to 50 km.

15. The communication system of claim 9, wherein the plurality of beams has a frequency in the range of 400 to 900 MHz.

16. A method for satellite communication, the method comprising:

providing, via a plurality of phased array antennas, a plurality of beams and a field of view, the field of view having a plurality of cells and each of the plurality of beams is associated with one of the plurality of cells within the field of view, and each of the plurality of beams has one or more frequencies;

receiving, via the plurality of phased array antennas, a signal from a terrestrial user device via one of the plurality of beams so as to obtain an approximately constant or fixed delay based on the one or more frequencies;

detecting that the signal is within the field of view, the signal having less than approximately 1 Watt signal power and less than approximately 0 dB gain; and delay compensating signals relative to center or approximately center of each of the plurality of beams.

17. The method of claim 16, further comprising:

doppler compensating signals relative to center or approximately center of each of the plurality of beams.

18. The method of claim 16, wherein one or more of the plurality of cells has a diameter of approximately 40 to 50 km.

* * * * *